(12) United States Patent
Tonn

(10) Patent No.: US 6,469,666 B1
(45) Date of Patent: Oct. 22, 2002

(54) DIGITAL ANTENNA GONIOMETER AND METHOD

(75) Inventor: David A. Tonn, Charlestown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/977,907

(22) Filed: Oct. 10, 2001

(51) Int. Cl.[7] .................................................. G01S 3/12
(52) U.S. Cl. ........................ 342/431; 342/81; 342/441
(58) Field of Search ........................... 342/81, 154, 157, 342/431, 368, 440, 441

(56) References Cited

U.S. PATENT DOCUMENTS 5,402,132 A * 3/1995 Hall et al. .................. 342/432
5,714,961 A * 2/1998 Kot et al. ................... 343/769
6,160,519 A * 12/2000 Hemmi ....................... 343/754

* cited by examiner

*Primary Examiner*—Dao Phan
(74) *Attorney, Agent, or Firm*—Michael J. McGowan; James M. Kasischke; Michael F. Oglo

(57) ABSTRACT

A digital goniometer and steering method are provided which may be used, in a preferred embodiment, for producing a figure-eight antenna reception pattern oriented at any selectable angle. The digital goniometer works with the signals from a pair of orthogonal antenna loops. In a presently preferred embodiment a first register and a second register are provided for a respective first variable gain amplifier and a second variable gain amplifier. The first and second registers receive from software a digital value related to a sine function and cosine function of the selectable angle. The first and second registers are utilized to set the gain of the first and second variable gain amplifiers. The outputs of the first and second variable gain amplifiers are added to produce the reception signal.

9 Claims, 2 Drawing Sheets

DIGITAL ANTENNA GONIOMETER AND METHOD

STATEMENT OF THE GOVERNMENT INTEREST

The invention described herein may be manufactured and used by or for the Government of the United States of America for Governmental purposes without the payment of any royalties thereon or therefore.

CROSS-REFERENCE TO OTHER PATENT APPLICATIONS

Not applicable.

BACKGROUND OF THE INVENTION (1) Field of the Invention

The present invention relates to antennas and, more particularly, to a digital goniometer especially suitable for controlling a steerable antenna pattern from two orthogonal antennas over the VLF/LF communications band.

(2) Description of the Prior Art

Submarine antenna systems may frequently utilize the VLF/LF communications band (8 kHz–200 kHz) by means of two magnetic loop antennas which may be referred to as a multifunction antenna. The two magnetic loop antennas are preferably identical and aligned perpendicular to each other in one housing. One loop is referred to as the Fore and Aft (F/A) antenna. The other loop is referred to as the Athwartships (ATH) antenna. The multifunction antenna does not rotate, and there are null spots where the antenna gain is near zero. Orienting this null spot toward a source of interference is desirable to reduce the received interference. Likewise, orienting the highest gain region of the antenna toward the desired signal is also desirable. Currently, an analog mechanical device is used to combine the F/A signal with the ATH signal in order to obtain the desired orientation. The mechanical device contains a stator for each loop and a rotor that can be rotated to adjust the proportional contribution of each loop. The device employs Faraday's Law of Induction for its operation. The mechanical device presently utilized is an electromechanical resolver often known as a goniometer. While goniometers may be utilized to achieve other effects and functions, a goniometer may also be utilized for steering a figure-eight antenna pattern with two identical orthogonal antennas by mechanical means.

It would be desirable to provide a more accurate, lightweight, compact, antenna goniometer that does not require elaborate external drive circuitry and has no moving parts.

Patents that show attempts to solve the above and other related problems are as follows:

U.S. Pat. No. 5,402,132, issued Mar. 28, 1995, to Hall et al., discloses a direction finding system utilizing a single monopole/crossed slot antenna in combination with associated electronic circuitry. Each of the four ports of the antenna are connected to amplitude varying elements whose outputs are combined by a power combiner. A microcontroller stores the signal. The microcontroller also generates the signals which control the amplitude variation supplied by each of the amplitude varying elements. Two configurations of the amplitude varying elements are provided by predetermined settings within the microcontroller. The two settings are selected to configure the antenna on two distinct reception patterns, each with a predetermined angular offset from a reference direction. In operation the antenna will be configured for a first reception pattern. The signals received will be detected, quantified, and stored by the microcontroller which subsequently reconfigures the antenna for a second reception pattern. A second signal is received by the antenna in the second configuration and again is detected, quantified, and stored by the microcontroller. The microcontroller determines the difference between the two signals and, based upon a predetermined calibration curve relating differences in the stored signals to the angle of arrival of the signals from the reference direction, determines the angle from which the signal arrived.

U.S. Pat. No. 6,160,519, issued Dec. 12, 2000, to Christian O. Hemmi, discloses a two-dimensionally steered antenna system including a planar lensing system operable to focus signals received from a plurality of ground-based cells. A first steering system is operable to steer a beam for each ground-based cell in a first direction by weighing signals associated with the ground-based cell based on a position of the antenna system relative to the ground-based cell in the first direction. A second steering system is operable to steer the beam for each ground-based cell in a second direction by weighing signals associated with the ground-based cell based on a position of the antenna system relative to the ground-based cell in the second direction.

U.S. Pat. No. 4,150,382, issued Apr. 17, 1979, to Ray J. King, discloses an invention which provides a guided wave antenna having a radiation pattern which can be controlled electronically, by control signals derived from a computer or any other suitable source. In this way, the directional characteristics of the antenna can be adjusted and/or scanned rapidly, without any mechanical manipulation of the antenna. In one embodiment, a guided radio wave is launched along an antenna surface having an array of elements which provide variable non-uniform surface impedance adapted to be controlled by electronic signals. For example, each variable impedance element may comprise a wave guide section having one end leading from the antenna surface. Each wave guide section may include a solid-state electronic reflection amplifier having characteristics which can be varied by supplying control signals to the amplifier, to vary the magnitude and phase angle of the wave reflected from the reflection amplifier. By changing the control signals supplied to any particular reflection amplifier, it is possible to cause attenuation or amplification and phase shift of the guided wave as it passes across the particular wave guide section. A wide variety of solid-state electronic control elements may be provided along one or more surfaces of the antenna. In another embodiment, a wave traveling in a closed subsurface wave guide is coupled into the guided wave open surface structure, using an array of wave guide elements containing electronically controllable amplifiers and phase shifters.

U.S. Pat. No. 5,714,961, issued Feb. 3, 1998, to Kot et al., discloses a directional planar antenna. The antenna has an array of coaxial ring-slot radiating elements formed through a conductive layer on a dielectric substrate. A number of probes, coupled to the ring-slot elements, selectively excite a separate resonant mode on each ring-slot element. The resonant mode supported by a ring-slot element depends upon the geometry of that ring-slot element. The resonant modes combine in the far field to form a radiation pattern directional in azimuth and elevation. By adjustment of the relative phase difference or relative amplitude between the excited modes, the radiation pattern can be steered.

The above-cited prior art does not show a suitable lightweight, compact antenna goniometer with non-moving components utilizing two orthogonal antennas that is operable for steering a figure-eight antenna pattern. Those skilled in the art will appreciate the present invention that addresses the above and other problems.

SUMMARY OF THE INVENTION

Accordingly, it is an object of the present invention to provide an improved antenna goniometer.

It is another object of the present invention to provide an antenna goniometer operable with two orthogonal antennas for steering a figure-eight antenna pattern.

An advantage of a system in accord with the present invention is an antenna goniometer that can be operated in a fully automated manner that can be controlled from software.

In accordance with the present invention, a VLF/LF communications antenna goniometer for a first antenna loop and a second antenna loop is provided that is operable for controlling an angular orientation of a figure-eight antenna reception pattern for the first antenna loop and the second antenna loop. The preferred embodiment shows first and second antennas which are orthogonal with respect to each other; however, the teachings of this invention can be applied by one of ordinary skill in the art to other antenna configurations. The goniometer comprises one or more elements such as, for instance, a first variable gain amplifier for a first signal produced utilizing the first antenna wherein the first variable gain amplifier has a first output, a first data register for storing a digital value related to a first gain setting for the first variable gain amplifier such that the first gain setting is related to the angular orientation, a second variable gain amplifier for the second antenna for a second signal produced utilizing the second antenna wherein the second variable gain amplifier has a second output, a second data register for storing a digital value related to a second gain setting for the second variable gain amplifier such that the second gain setting is related to the angular orientation, and a summing amplifier for combining the first output and the second output.

Other elements of the goniometer may comprise a first digital data link for supplying the first gain setting to the first data register and a second digital data link for supplying the second gain setting to the second data register. In the preferred embodiment, the first gain setting is a sine function related to the angular orientation, and the second gain setting is a cosine function related to the angular orientation.

The goniometer may further comprise an inverter for inverting at least one of the first signal or the second signal. The summing amplifier adds the first output and the second output together.

In operation, a method is provided for controlling an antenna reception pattern for the first antenna and second antenna wherein the method comprises one or more steps such as, for instance, producing a first antenna signal utilizing the first antenna, producing a second antenna signal utilizing the second antenna, determining a first gain signal related to a desired antenna reception pattern, determining a second gain setting related to the desired antenna reception pattern, digitally adjusting the first gain setting for the first antenna signal to produce a first antenna processed signal, digitally adjusting the second gain setting for the second antenna signal to produce a second antenna processed signal, and combining the first antenna processed signal and the second antenna processed signal. Additional steps may include determining the first gain signal and the second gain signal to produce a figure-eight reception pattern having a desired angular orientation.

Other method steps may include providing that the first antenna signal and the second antenna signal are substantially in phase with each other to produce a figure-eight pattern. Additional steps may include utilizing software to adjust the first gain setting and the second gain setting.

In more detail, the method may comprise controlling a first magnitude of the first antenna signal with the first gain setting to produce the first antenna processed signal, and controlling a second magnitude of the second antenna signal with the second gain setting to produce the second antenna processed signal and/or providing that the first gain setting is related to a sine function of an angular orientation of a figure-eight reception pattern, and providing the second gain setting is related to a cosine function of the angular orientation of the figure-eight reception pattern.

In other words, a method is provided to produce a figure-eight antenna pattern with a selected angular orientation comprising one or more steps such as, for instance, providing that a first antenna signal and a second antenna signal are substantially in phase with respect to each other, and digitally controlling a first magnitude of the first antenna signal and a second magnitude of the second antenna signal such that the first magnitude is related to a sine function of the angular orientation and the second magnitude is related to cosine function of the angular orientation. Other method steps then include combining the first antenna signal with the second antenna signal. The combining may further comprise summing the first antenna signal to the second antenna signal. Preferably the method comprises utilizing software to compute a first gain setting for the first magnitude and a second gain setting for the second magnitude, storing the first gain setting in a first register and storing the second gain setting in a second register. Preferably the method permits for dynamically changing the angular orientation utilizing software.

These and other objects, features, and advantages of the present invention will become apparent from the drawings, the descriptions given herein, and the appended claims. It will be understood that above listed objects and advantages of the invention are intended only as an aid in understanding aspects of the invention, are not intended to limit the invention in any way, and do not form a comprehensive list of objects, features, and advantages.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawing wherein corresponding reference characters indicate corresponding parts and wherein.

BRIEF DESCRIPTION OF THE PREFERRED EMBODIMENTS

Figure 1:
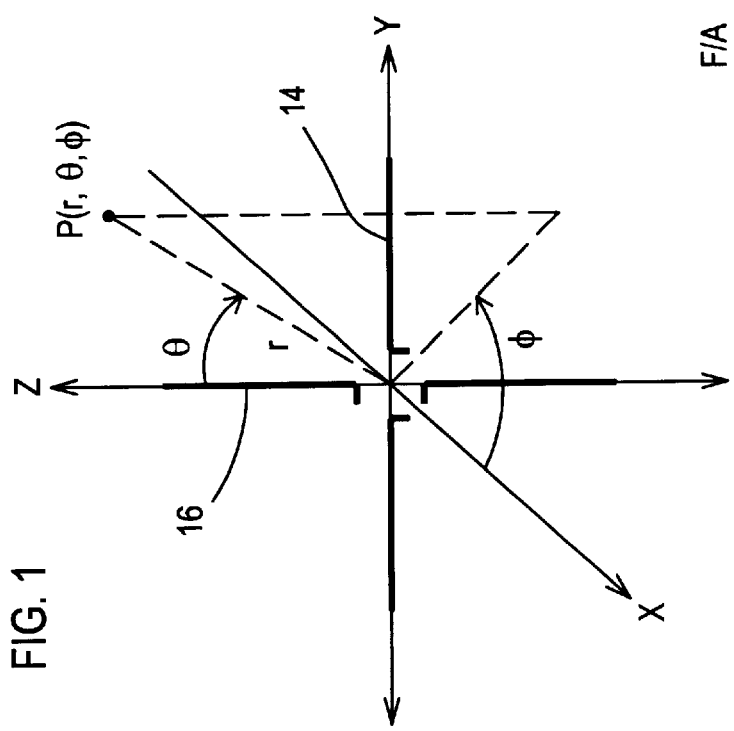
FIG. 1 is a schematic diagram showing a pair of antennas perpendicular to each other in a coordinate system.

Referring now to the drawings, and more particularly to FIG. 1, there is shown a circuit diagram of antenna goniometer 10 in accord with the present invention. Antenna goniometer 10 provides a more lightweight, compact antenna goniometer which does not require elaborate external drive circuitry. Furthermore, antenna goniometer 10 has no moving parts and is fully controllable by software from a bus such as a TTL parallel bus.

Figure 2:
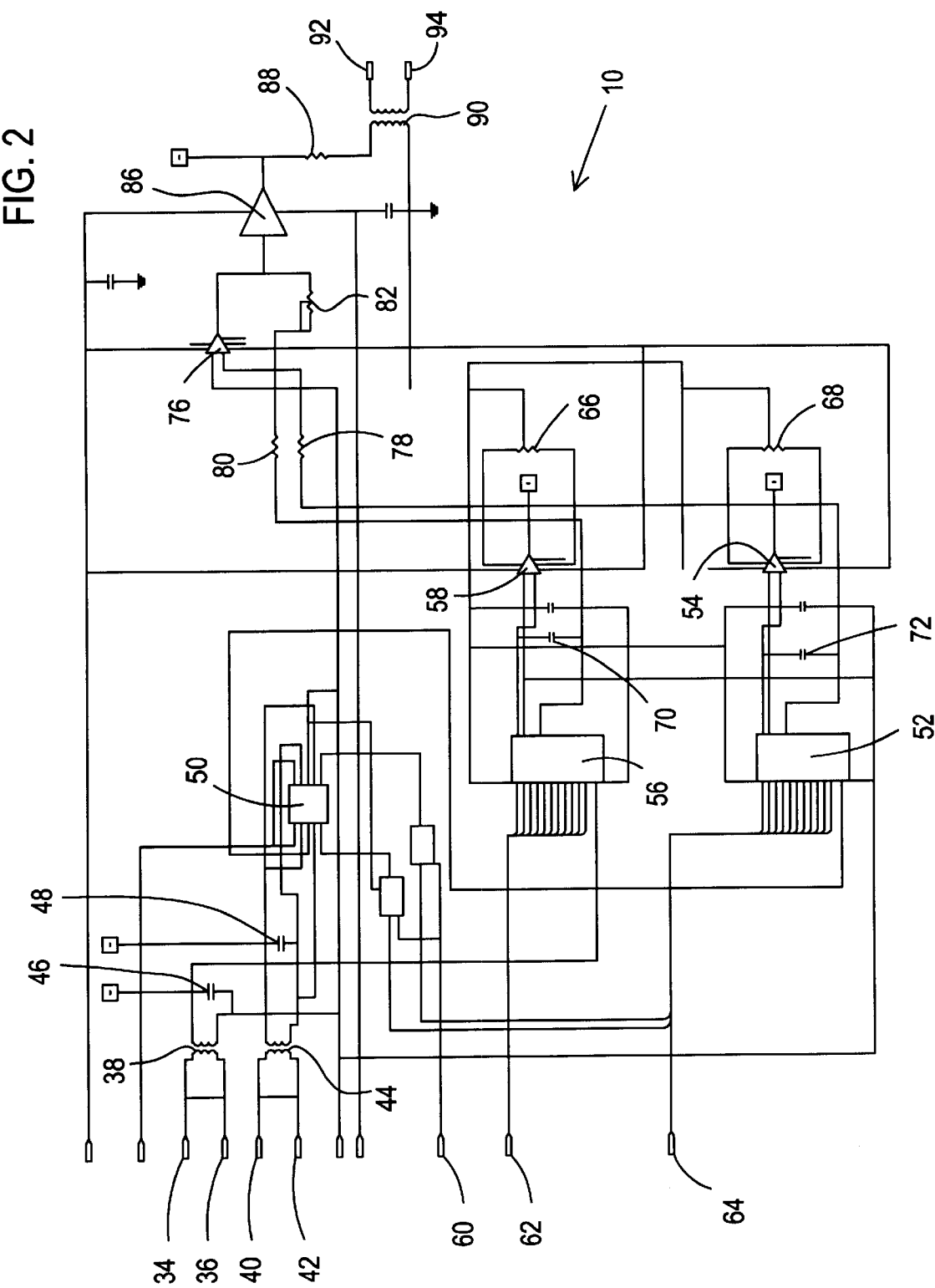
FIG. 2 is a schematic diagram of a digital antenna goniometer in accord with the present invention.

FIG. 2 discloses antenna system 12 with electrically short electric loop antennas 14 and 16 perpendicular to each other and mapped onto a coordinate system which utilizes spherical coordinates as indicated, such that antenna 16 is aligned with the z-axis and antenna 14 is aligned with the y-axis. This arrangement represents two crossed electric loops, but because of duality, it can also be used to represent a pair of orthogonal magnetic loop antennas.

Beginning from principles of the patterns of individual electrically short loops, equations governing the tandem performance can be derived and the conditions under which steerable figure-eight responses can be determined. Thus, it can be shown that the square of the magnitude of the filed pattern of antenna system 12 is:

$$|H_{tot}|^2 = K \cdot |\sin\theta \cos\alpha - \cos\theta + j \sin\theta \sin\alpha|^2 = K(1 - \sin 2\theta \cos\alpha), \quad (1)$$

where:
- $\Phi$ is replaced with 90° because we are concerned with field patterns in the y-z plane,
- $\alpha$ is the phase difference of the current feeds for the antennas wherein the feed currents are of equal magnitude, and
- K is a constant.

In the event that $\alpha=0°$ (i.e., the two antennas are fed in phase), the resulting pattern is a figure eight, rotated so that its null axis is aligned with 45 on the polar scale. However, as $\alpha$ is increased (the antennas now being fed out of phase), the null begins to vanish, leaving a peanut-shaped pattern. It can also be shown that the net power varies only by approximately 1.5 dB over its domain for an 80 phase shift. The exact amount of tolerance allowed on $\alpha$, then, would depend on the amount of loss that can be tolerated due to the depth of the null in the pattern. If high loss can be tolerated, a looser tolerance on $\alpha$ is allowed.

For figure-eight pattern generation, consider now the more general case of two arbitrary antenna feed currents with an arbitrary phase difference between them. Suppose the currents are:

$$I_z = Ae^{j\alpha}, \quad I_y = B. \quad (2)$$

It can then be shown that the resulting total magnetic field produced by this excitation will be $$\vec{H}_{tot} = j\beta\Delta L \frac{e^{-j\beta r}}{4\pi r}(Ae^{j\alpha}\sin\theta - B\cos\theta)\hat{\phi}, \quad (3)$$

where:
- $\Delta L$ is the length of the antennas, and
- $\beta$ is the wavenumber in the medium that the fields propagate through.

To determine the farfield power pattern, the magnitude must be computed:

$$|H_{tot}|^2 = \left|j\beta\Delta L\frac{e^{-j\beta r}}{4\pi r}(Ae^{j\alpha}\sin\theta - B\cos\theta)\right|^2 = \quad (4)$$

$$K\cdot|A(\cos\alpha + j\sin\alpha)\sin\theta - B\cos\theta|^2.$$

Again the term K represents a term that is not dependent on the polar coordinate $\theta$ and does not need to be considered in determining the shape of the power pattern. Performing some simplifications, we find that this expression reduces to $$|H_{tot}|^2 = A^2\sin^2\theta + B^2\cos^2\theta - AB\cos\alpha\sin 2\theta. \quad (5)$$

To determine the possible ways of using the above equation to give steerable figure eight.

If we make the substitution $X = A\sin\theta$, $Y = B\cos\theta$, the power pattern reduces to $$|H_{tot}|^2 = X^2 + Y^2 - 2XY\cos\alpha. \quad (6)$$

This is a form recognizable as the Law of Cosines from trigonometry. Using this knowledge, we can draw some conclusions about the possible existence of nulls in the pattern. If desired, we can visualize the power pattern's relationship to X and Y as a triangle where X and Y are adjacent legs with angle $\alpha$ between the legs and $|H_{tot}|^2$ is the leg opposite angle $\alpha$. Clearly, if $\alpha=90°$, then the triangle is a right triangle, with the magnitude of the power patter as its hypotenuse. Such a triangle cannot, according to the Pythagorean Theorem, have a zero length hypotenuse unless both legs of the triangle are of zero length. Therefore, it is not possible to generate a pattern containing nulls at all with a 90 phase shift between the antennas. It is also apparent that for angles $\alpha \neq 0°$, it is not possible for a null to occur unless, of course, both X and Y are zero. This, however, is an impossibility, since X depends on $\sin\theta$, and Y depends on $\cos\theta$, and these functions are never zero simultaneously.

To form a true null in the pattern, then, it is necessary that $\alpha=0°$ (i.e., the two signals must be in phase). For in-phase currents, then the power pattern is given by $$|H_{tot}|^2 = A^2\sin^2\theta + B^2\cos^2\theta - 2AB\sin\theta\cos\theta =$$
$$(A\sin\theta - B\cos\theta)^2. \quad (7)$$

To locate the nulls in the pattern, we solve for angles $\theta$ that render the equation zero:

$$A\sin\theta - B\cos\theta = 0 \Rightarrow \tan\theta = \frac{B}{A} \Rightarrow \theta = \arctan\left(\frac{B}{A}\right) \quad (-90 \leq \theta \leq +90). \quad (8)$$

We see here, then, that a single null axis exists for the pattern and that its position is wholly dependent on the magnitudes of the currents feeding the antennas. By appropriate choices of A and B, then, we can steer the null in the pattern to any desired location. From the point of view of implementation, it would be desirable to remove the arctangent from the computation. This is accomplished by choosing A and B such that $A=\cos\gamma$, $B=\sin\gamma$. In this way, the argument of the arctangent function is the tangent of the angle $\gamma$, the angle to which the null is to be steered. The resulting power pattern will be given by:

$$|H_{tot}|^2 = (\sin\theta\cos\gamma - \cos\theta\sin\gamma)^2 = \sin^2(\theta - \gamma). \quad (9)$$

This pattern may be recognized as that of a standard figure-eight antenna pattern rotated by $\gamma$ degrees. The null in the pattern remains well defined for low phase differences; the exact tolerance on $\alpha$ will depend on the requirement for the null depth of the figure-eight pattern.

In a real network, it will not always be possible to create a situation where the two signals from the antennas possess the exact magnitudes and phases to produce a perfect omni or figure-eight pattern. It is of value to see what effect the errors in magnitude and phase will have on the resulting patterns for the figure-eight antenna.

The location of the minimum in the pattern can be determined where the value of θ satisfies $$\frac{\partial}{\partial \theta}|H_{tot}|^2 = 0 \Rightarrow \frac{\partial}{\partial \theta}(A^2\sin^2\theta + B^2\cos^2\theta - AB\cos\alpha \sin 2\theta) = 0. \quad (10)$$

By working out the partial derivative, it can be shown that for positive values of A and B the pattern minimum occurs for $$\theta_{min} = \frac{1}{2}\arctan\left(\frac{2AB\cos\alpha}{A^2 - B^2}\right) + \frac{m\pi}{2} \quad m = 0, 2, 4, \ldots \quad (11)$$

It can also be shown that the pattern maximum occurs 90 away from the pattern minimum:

$$\theta_{max} = \frac{1}{2}\arctan\left(\frac{2AB\cos\alpha}{A^2 - B^2}\right) + \frac{n\pi}{2} \quad (n = 1, 3, 5, \ldots) = \theta_{min} + \frac{\pi}{2} \quad (12)$$

The min-to-max ratio can now be determined by substituting the above values of θ into the expression for the general power pattern. It can be shown that the resulting M is given by:

$$M = \frac{A^2\sin^2\theta_{min} + B^2\cos^2\theta_{min} - AB\cos\alpha \sin 2\theta_{min}}{A^2\cos^2\theta_{min} + B^2\sin^2\theta_{min} + AB\cos\alpha \sin 2\theta_{min}}. \quad (13)$$

From these equations, it can be seen that errors in the magnitudes and phase of the currents on the antennas can lead to non-ideal performance when the signals are combined to produce the figure-eight pattern. For instance, a non-zero phase difference α will cause a position error in the location of the null in a figure-eight pattern.

Figure 3:
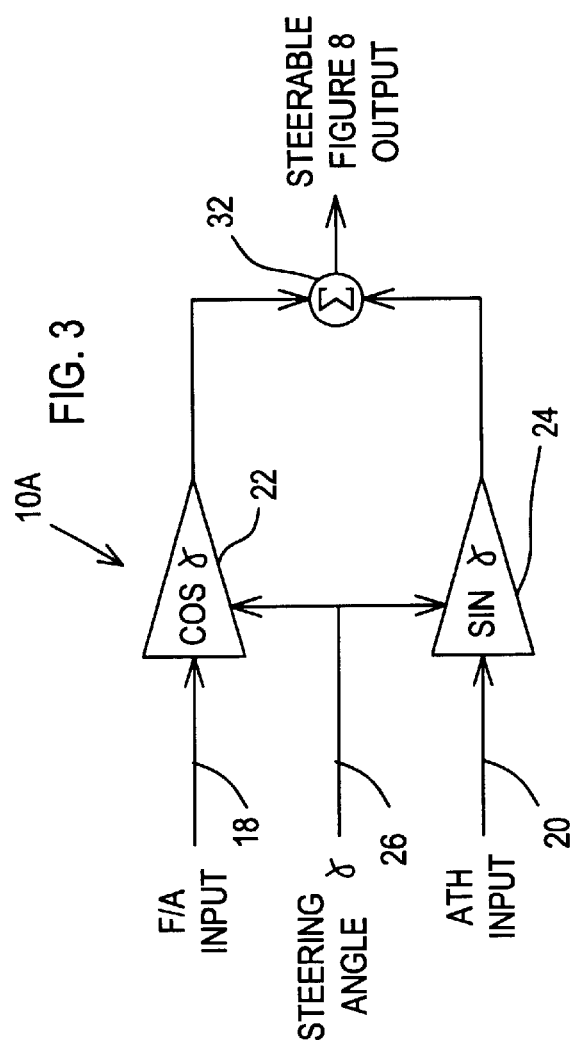
FIG. 3 is a block diagram of a goniometer operable for steering a VLF/LF figure-eight antenna pattern.

FIG. 3 shows a functional block diagram of system 10A to combine two orthogonal patterns into omni and/or steerable figure-eight patterns. The two antenna inputs 18 and 20 are referred to as the F/A (fore/aft) and ATH (athwart) antennas, respectively. Variable gain amplifiers 22 and 24 have a gain of cos γ and sin γ, respectfully, where the angle γ input to steer to is indicated at 26. Summation output 32 produces a steerable figure-eight output.

The details of an electronic circuit to perform the functions shown in FIG. 3 for a steerable figure-eight output are indicated in FIG. 2. This circuit is specifically tailored to VLF/LF radio waves. One of ordinary skill in the art could devise a similar circuit for higher frequencies using monolithic components. In FIG. 2, F/A antenna input is preferably provided by a 50Ω cable to terminals F/A Hi and F/A Lo, designated as 34 and 36, respectively. The F/A antenna input signal is then isolated by transformer 38. Likewise, the ATH antenna input is provided to terminals ATH Hi and ATH Lo, designated as 40 and 42, respectively, by a 50Ω cable and is isolated by transformer 44. Capacitors 46 and 48 provide filtering on the input signals. Inversion of the ATH channel, if needed depending on the desired quadrant of the antenna pattern, is provided by relay 50 in response to an invert signal on line 60. Relay 50 selectively reverses the polarity of the ATH signal before the ATH signal arrives at the ATH variable gain amplifier which is comprised of digital-to-analog component (DAC) 52 and amplifier 54 which components may preferably be connected together in a feedback loop to form a variable gain amplifier. The F/A signal is applied to F/A variable gain amplifier which is comprised of DAC 56 and amplifier 58 preferably connected together in a feedback loop to form a variable gain amplifier.

The gain settings for the F/A variable gain amplifier and the ATH variable gain amplifier are supplied by F/A steering input 62 and ATH steering input 64 by software controlling the system. Thus, inputs 62 and 64 may typically each comprise a data bus. The F/A gain setting is stored in a register within DAC 56 and the ATH gain setting is stored in a register with DAC 52. The software for antenna goniometer 10 computes, from a given null steering angle φ, the required gains of the F/A and ATH channels: sin φ and cos φ, respectively. Inversion of the ATH signal by inverter 50 is provided to allow steering into the 2nd and 4th quadrants of the plane of the antenna pattern.

Trimmer potentiometers 66 and 68 provide zero-offset adjustment for the variable gain stages. Capacitors 70 and 72 shunt any out-of-band high frequency (HF) interference from the signal lines. The scaled signals are then fed to summing amplifier or processor 74 formed by amplifier 76 and resistors 78, 80, and 82. Variable resistor 82 provides a manual gain adjustment. The summation of signals is provided at junction 84.

Buffer amplifier 86, together with resistor 88 and transformer 90 are preferably utilized to provide a 50Ω drive stage to drive the balanced output lines 92 and 94.

Thus, the operation of circuit 10 is as follows and is in accord with the mathematical theory of steerable antenna patterns described hereinbefore. The signals from the orthogonal antennas denoted herein by F/A (Fore/Aft) and ATH (Athwart) enter the system as described hereinbefore at inputs 34, 36 and 40, 42, respectively. The signals are directed to respective variable gain amplifiers. The F/A variable gain amplifier is comprised of DAC 56 and amplifier 58. The ATH variable gain amplifier is comprised of DAC 52 and amplifier 54. The gain settings for the variable gain amplifiers are preferably stored in a register in the respective DAC 56 and DAC 52. The gain settings come from the controlling software. The software has a F/A steering link input at 62 and an ATH steering link at 64. Thus, links 62 and 64 preferably comprise suitable digital data busses that are used for inputting the gain settings into the respective registers within DAC 52 and DAC 56. Software is preferably utilized to compute the required gain settings from a given null steering angle and input the gain settings whenever desired. The gain settings may be relatively constant or may change to create some desired pattern, such as a rotating figure-eight pattern, with a desired timing such as a desired number of rotations per minute. An inversion of the ATH signal is provided by inverter 50 to allow steering into the 2nd and 4th quadrants of the plane of the antenna pattern. The resultant signals from the variable gain amplifier are added by a summing amplifier and presented to the output at 92 and 94.

While a particular circuit for a presently preferred embodiment has been described, it will be understood that the invention is not limited to this particular circuit and could be implemented in other ways.

It will be appreciated by those skilled in the art that the invention can also be implemented using a suitable programmed general purpose computer and/or special purpose hardware, with program routines or logical circuit sets performing as processors. Program routines, electronic circuits, or logical circuit sets may also be referred to as processors or the like.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A digital goniometer for an antenna having a first antenna loop and an orthogonally arranged second antenna loop, said goniometer comprising:

a first data register storing a first digital value related to an angular orientation;

a first variable gain amplifier joinable to said first antenna loop and having a first digital gain input joined to said first data register and a first amplified output;

a second data register storing a second digital value related to said angular orientation;

a second variable gain amplifier joinable to said second antenna loop and having a second digital gain input joined to said second data register and a second amplified output; and a summing amplifier joined to said first amplifier output and said second amplifier output and having a summed output for summing said first amplifier output and said second amplifier output.

2. The goniometer of claim 1 further comprising a digital processor having an input, a first output joined to said first data register for providing said first digital value and a second output joined to said second data register for providing said second digital value.

3. The goniometer of claim 2 wherein said input represents a steering angle, said first output is the sine of said steering angle, and said second output is the cosine of said steering angle.

4. The goniometer of claim 1 further comprising a selectable inverter having an input joinable to said second antenna loop in place of said second variable gain amplifier, an output joined to said second variable gain amplifier, and an activation port.

5. The goniometer of claim 4 further comprising a digital processor having an input, a first output joined to said first data register for providing said first digital value, a second output joined to said second data register for providing said second digital value, and a sign output joined to said inverter activation port.

6. The goniometer of claim 5 wherein said input represents a steering angle, said first output is the sine of said steering angle, said second output is the cosine of said steering angle, and said sign output activates said inverter for providing the correct quadrant.

7. A method for steering an antenna reception pattern for a first antenna loop and an orthogonal second antenna loop, said method comprising:

receiving a first antenna signal from said first antenna loop;

receiving a second antenna signal from said second antenna loop;

determining a first gain signal related to said desired antenna reception pattern steering;

determining a second gain signal related to said desired antenna reception pattern steering;

amplifying said received first antenna signal by said determined first gain signal to produce a first amplified antenna signal;

amplifying said received second antenna signal by said determined second gain signal to produce a second amplified antenna signal; and summing said first amplified antenna signal and said second amplified antenna signal to give a steered antenna signal.

8. The method of claim 7 further comprising the step of receiving a steering angle, said step of determining a first gain signal comprising providing the sine of said received steering angle as said first gain signal, and said step of determining a second gain signal comprising providing the cosine of said received steering angle as said second gain signal.

9. The method of claim 7 further comprising the step of utilizing a digital processor to provide said first gain signal and said second gain signal in response to a programmed algorithm.

* * * * *